(12) United States Patent
Meyers et al.

(10) Patent No.: US 7,032,874 B2
(45) Date of Patent: Apr. 25, 2006

(54) SUSPENSION ADJUSTING HANDLE FOR A SUSPENSION SYSTEM

(75) Inventors: Kenneth A. Meyers, Reedsburg, WI (US); Douglas C. Hahn, La Valle, WI (US)

(73) Assignee: Seats Incorporated, Reedsburg, WI (US)

( * ) Notice: Subject to any disclaimer, the term of this patent is extended or adjusted under 35 U.S.C. 154(b) by 242 days.

(21) Appl. No.: 10/719,349

(22) Filed: Nov. 21, 2003

(65) Prior Publication Data

US 2005/0109913 A1    May 26, 2005

(51) Int. Cl.
*F16M 13/00* (2006.01)

(52) U.S. Cl. .................. 248/575; 248/421; 248/576; 248/588

(58) Field of Classification Search ........... 248/577, 248/421, 419, 576, 592, 550, 561, 575, 588
See application file for complete search history.

(56) References Cited

U.S. PATENT DOCUMENTS

| | | | | |
|---|---|---|---|---|
| 3,086,742 A | * | 4/1963 | Severson | 248/575 |
| 3,599,232 A | * | 8/1971 | Tabor | 248/567 |
| 3,874,626 A | * | 4/1975 | Gross et al. | 248/562 |
| 4,029,283 A | * | 6/1977 | Swenson et al. | 248/567 |
| 4,072,287 A | * | 2/1978 | Swenson et al. | 248/574 |
| 4,241,894 A | * | 12/1980 | Okuyama | 248/576 |
| 4,397,440 A | * | 8/1983 | Hall et al. | 248/550 |
| 4,448,386 A | * | 5/1984 | Moorhouse et al. | 248/564 |
| 4,729,539 A | * | 3/1988 | Nagata | 248/575 |
| 4,852,849 A | * | 8/1989 | Jones | 248/575 |
| 4,856,763 A | * | 8/1989 | Brodersen et al. | 267/131 |
| 5,364,060 A | * | 11/1994 | Donovan et al. | 248/588 |
| 5,794,911 A | * | 8/1998 | Hill | 248/588 |
| 5,927,679 A | * | 7/1999 | Hill | 248/588 |
| 5,984,410 A | * | 11/1999 | Brodersen | 297/339 |
| 6,186,467 B1 | * | 2/2001 | Wahls | 248/564 |
| 2003/0201660 A1 | * | 10/2003 | Janscha et al. | 297/216.17 |
| 2004/0144906 A1 | * | 7/2004 | Hill et al. | 248/421 |
| 2005/0001133 A1 | * | 1/2005 | Bostrom et al. | 248/419 |

OTHER PUBLICATIONS

Kubota Corporation, photographs of an adjustable seat suspension assembly, publically disclosed prior to Nov. 21, 2002.

Milsco Manufacturing Company, promotional material of an adjustable seat suspension assembly, published prior to Nov. 21, 2002.

Seats Incorporated, drawings of an adjustable seat suspension assembly, publicly disclosed prior to Nov. 21, 2002.

* cited by examiner

*Primary Examiner*—Anita M. King
(74) *Attorney, Agent, or Firm*—Michael Best & Friedrich LLP

(57) ABSTRACT

A suspension system for a seat. The suspension system includes a first frame member, a second frame member connectable to the seat and movably coupled to the first frame member, a suspension member coupled to both the first frame member and the second frame member and suspending the second frame member above the first frame member, an adjustment mechanism coupled to the suspension member and manually manipulatable by an operator to adjust the stiffness of the suspension, a handle movable along a portion of the adjustment mechanism and facilitating manual manipulation of the adjustment mechanism, and an engaging member resiliently resisting movement of the handle under its own weight along the portion of the adjustment mechanism.

16 Claims, 5 Drawing Sheets

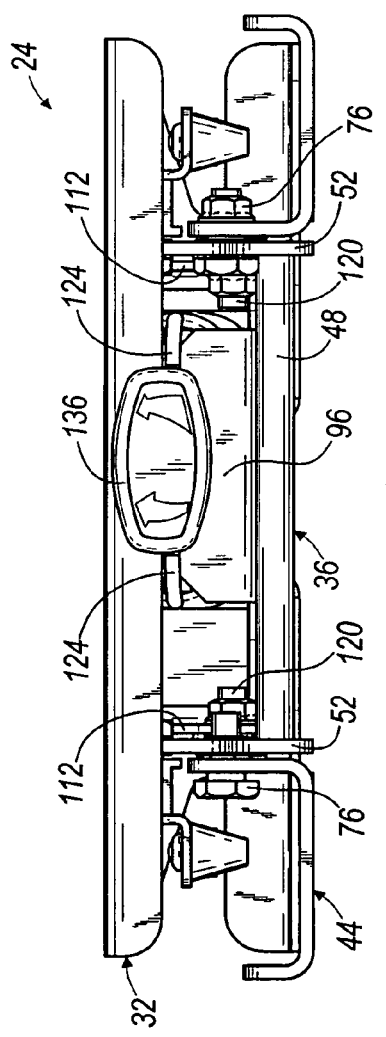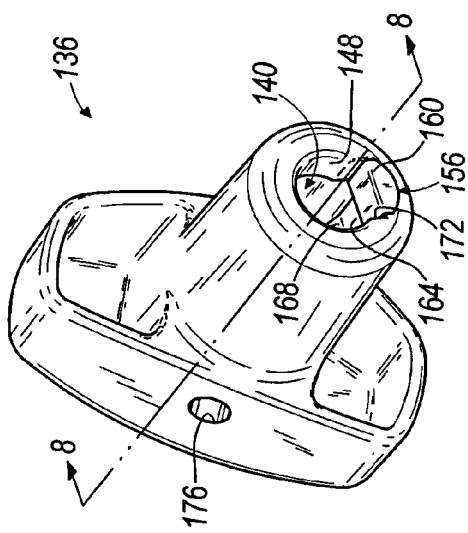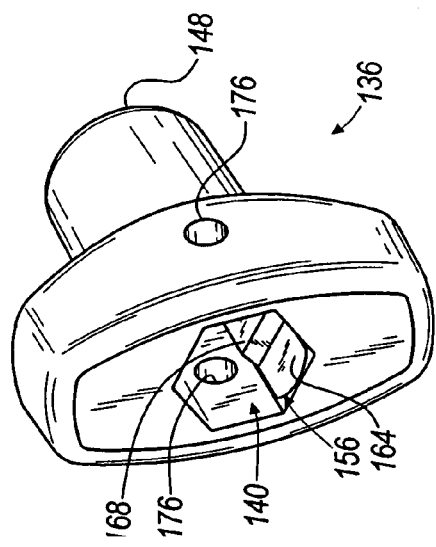

US 7,032,874 B2

SUSPENSION ADJUSTING HANDLE FOR A SUSPENSION SYSTEM

FIELD OF THE INVENTION

The present invention relates to suspension systems for seats and, more particularly, to suspension systems for seats that include suspension adjusting handles for adjusting the suspension of the seats.

BACKGROUND OF THE INVENTION

Suspension systems are used in a variety of vehicles, such as, cars, trucks, lawnmowers, construction equipment, all-terrain-vehicles (ATV's), etc., for the added comfort of the operators of such vehicles. Suspension systems can either be fixed or adjustable. Fixed suspension systems have a constant suspension with a fixed stiffness, while the stiffness of the suspension in adjustable suspension systems is adjustable.

SUMMARY OF THE INVENTION

In some aspects, the invention provides a suspension system for providing suspension to a seat on a vehicle. The suspension system includes a first frame member and a second frame member connectable to a seat and coupled to the first frame member. The second frame member is movable relative to the first frame member. The suspension system also includes a suspension member coupled to both the first frame member and the second frame member. The suspension member suspends the second frame member above the first frame member and resists movement of the second frame member relative to the first frame member. The suspension system further includes an adjustment mechanism coupled to the suspension member and manually manipulatable by an operator to adjust the stiffness of the suspension member and a handle to facilitate manual manipulation of the adjustment mechanism. The handle is movable along a portion of the adjustment mechanism between a first position and a second position. The suspension system also includes an engaging member resiliently resisting movement of the handle between the first position and the second position.

The suspension system may also include a threaded rod threadably coupled to the suspension member and rotatable to adjust the stiffness of the suspension and a handle coupled to the threaded rod to facilitate rotation of the threaded rod. The handle is slidable relative to the threaded rod. The engaging member may resiliently engage the threaded rod and resiliently resist sliding of the handle relative to the threaded rod.

The seat may pivot relative to the vehicle between a substantially horizontal position and a non-horizontal position. The above-described threaded rod may pivot with the seat between the substantially horizontal position and the non-horizontal position. The engaging member may resiliently engage the threaded rod to resiliently resist sliding of the handle, under the weight of the handle, along the threaded rod when the threaded rod is in the non-horizontal position.

BRIEF DESCRIPTION OF THE DRAWINGS

FIG. 3 is a front view of the suspension system and the suspension adjusting handle shown in FIG. 1.

FIG. 6 is a front perspective view of the suspension adjusting handle shown in FIG. 1.

FIG. 7 is a rear perspective view of the suspension adjusting handle shown in FIG. 1.

Figure 1:
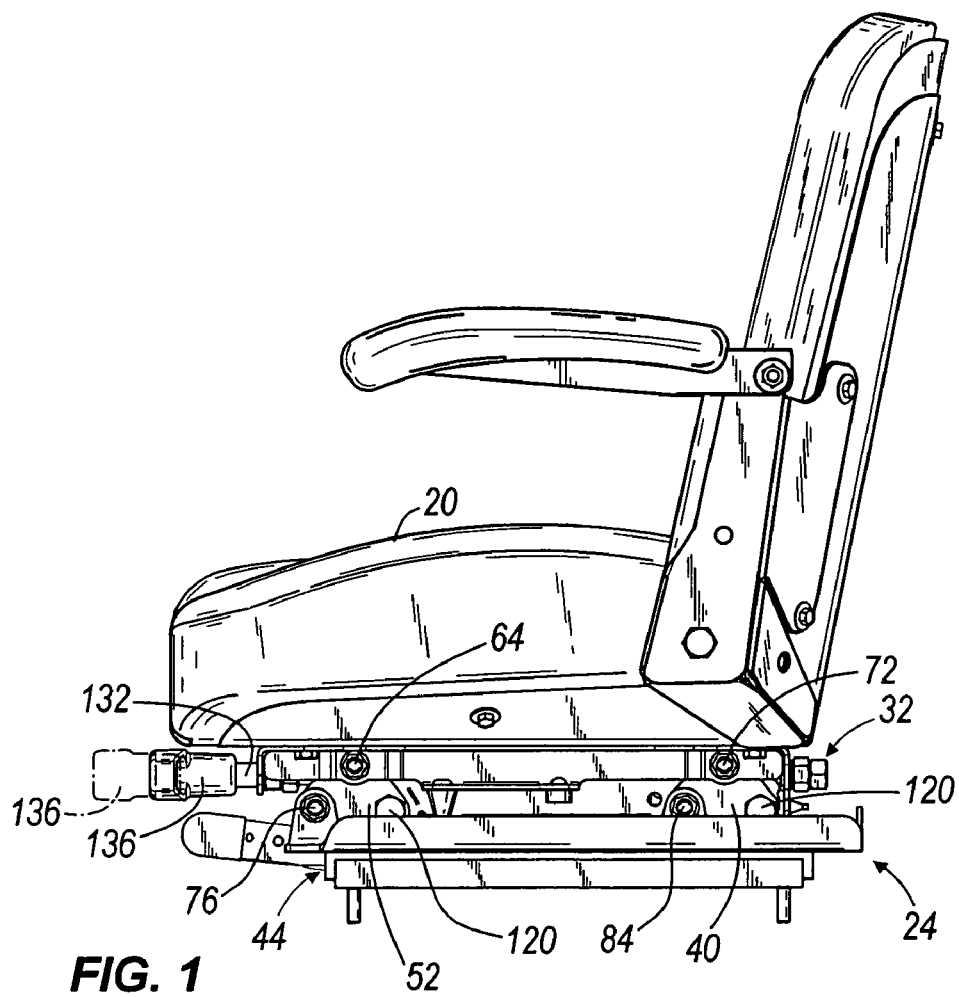
FIG. 1 is a side view of a seat and a suspension system including a suspension adjusting handle embodying the present invention, shown in a substantially horizontal position.

Before at least one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and variations thereof herein are used broadly and encompass direct and indirect connections and couplings. In addition, the terms "connected" and "coupled" and variations thereof are not restricted to physical or mechanical connections or couplings.

DETAILED DESCRIPTION

Figure 4:
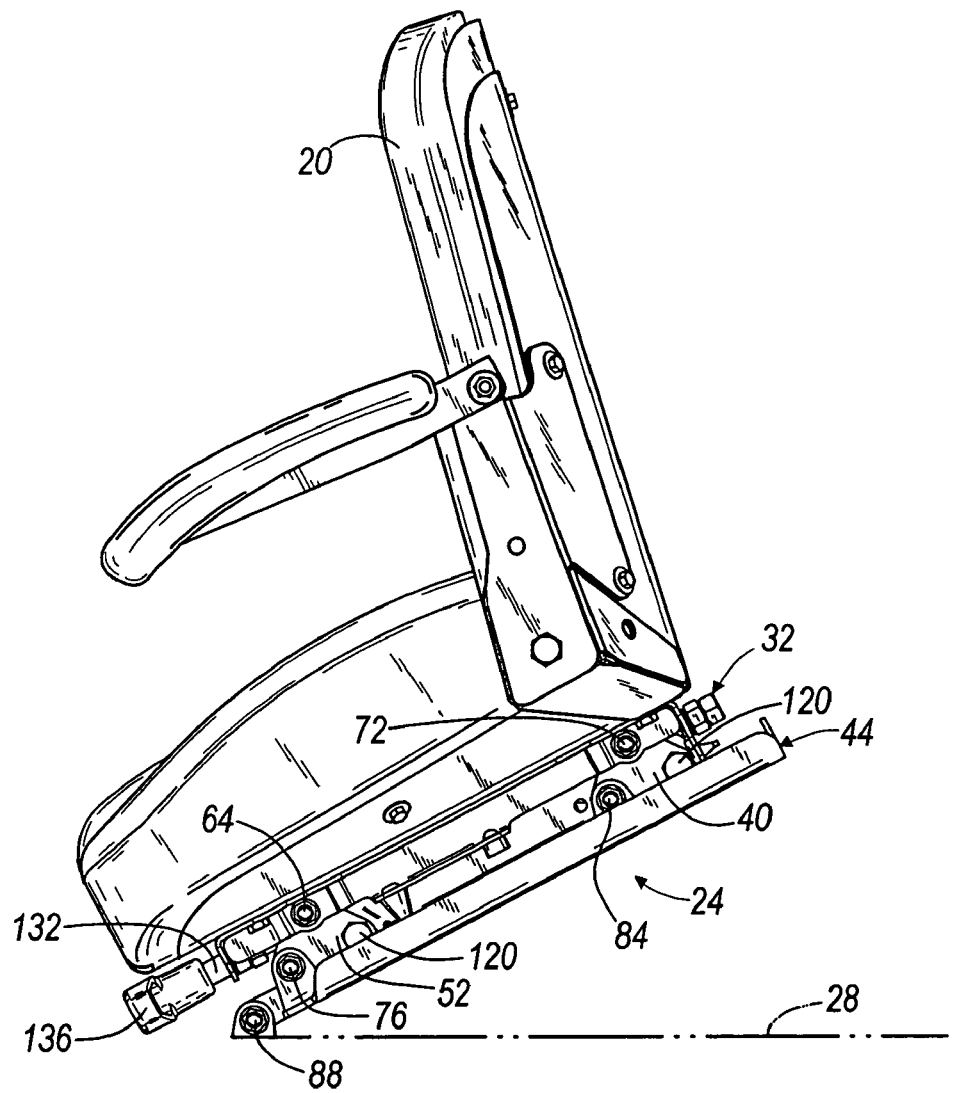
FIG. 4 is a side view of the seat, the suspension system and the suspension adjusting handle shown in FIG. 1, shown in a non-horizontal position.
Figure 5:
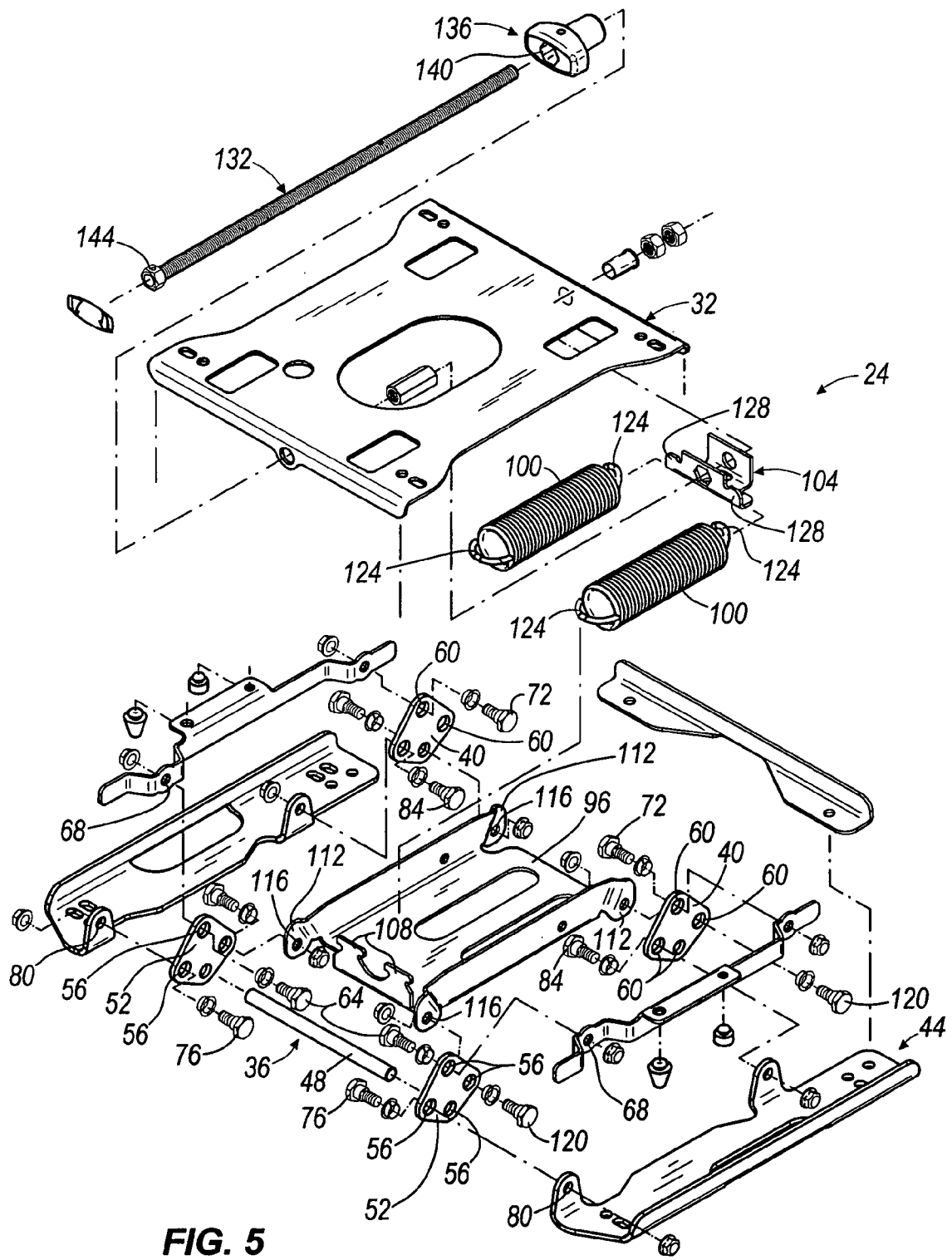
FIG. 5 is an exploded perspective view of the suspension system and the suspension adjusting handle shown in FIG. 1.

FIGS. 1–5 illustrate a seat 20 and a suspension system 24, which is connected between the seat 20 and a vehicle 28 (shown in phantom in FIG. 4). Suspension systems are often characterized by their "stiffness," which is a reference to the resistance of the seat to deflection due to a passenger sitting in the seat. The greater the resistance to deflection, the higher the stiffness of the seat.

The suspension system 24 includes an upper frame 32, a front cam member 36, a pair of rear cam members 40 and a lower frame 44. The upper frame 32 is connected to the seat 20 in a variety of manners, such as, for example fastening, welding, integrally forming, or other permanent or non-permanent connections. The upper frame 32 is also connected to the front cam member 36 and the rear cam members 40.

The front cam member 36 includes a rod 48 and a cam plate 52 positioned at each end of the rod 48. Each cam plate 52 includes four corners and defines an aperture 56 therethrough near each corner. The ends of the rod 48 are positioned in one of the apertures 56 of each cam plate 52. In the illustrated construction, the rod 48 is welded to the cam plates 52. Alternatively, the rod 48 may be integrally formed with the cam plates 52, fastened to the cam plates 52, or connected to the cam plates 52 in other manners of permanent or non-permanent connections and still be within the spirit and scope of the present invention.

The rear cam members 40 are similar to the cam plates 52 of the front cam member 36. Each rear cam member 40 includes four corners and defines an aperture 60 therethrough near each of the four corners.

The front cam member 36 is pivotally connected to the upper frame 32 by inserting a fastener 64 through one of the cam plate apertures 56 in each cam plate 52 and through upper frame apertures 68 defined in the upper frame 32. The rear cam members 40 are pivotally connected to the upper frame 32 by inserting a fastener 72 through one of the rear cam apertures 60 in each rear cam member 40 and through upper frame apertures 68 defined through the upper frame 32. The upper frame 32 is pivotal relative to the front and rear cam members 36, 40 about the fasteners 64, 72.

The front and rear cam members 36, 40 are pivotally connected to the lower frame 44 in a manner similar to the manner in which they are connected to the upper frame 32. To connect the front cam member 36 and the lower frame 44, a fastener 76 is inserted through another of the cam plate apertures 56 of each cam plate 52 and through lower frame apertures 80. To connect the rear cam members 40 to the lower frame 44, a fastener 84 is inserted through another of the rear cam apertures 60 of each rear cam member 40 and through lower frame apertures 80. The front and rear cam members 36, 40 are pivotal about the fasteners 76, 84 relative to the lower frame 44.

In some constructions the lower frame 44 is rigidly connected to the vehicle 28. In such constructions, the lower frame 44 may be rigidly connected to the vehicle 28 by using fasteners, welding, integrally forming, or other manners of rigidly connecting the lower frame 44 to the vehicle 28, such that the lower frame 44 does not move relative to the vehicle 28. In other constructions, the lower frame 44 may be pivotally or slidably connected to the vehicle 28 and allow the seat 20 to be pivoted or slid between a substantially horizontal position (see FIG. 1) and a non-horizontal position (see FIG. 4). In such embodiments, the lower frame 44 may include a pivot member 88 (see FIG. 4) positioned at a front or a rear of the lower frame 44 to allow the seat 20 to pivot about a front or rear, respectively, of the lower frame 44.

With continued reference to FIGS. 1–5, the suspension system 24 also includes a suspension assembly 92 for defining the stiffness of the suspension (e.g., establishing resistance to movement of the upper frame 32 down toward the lower frame 44 in response to an operator sitting in the seat and in response to dynamic forces arising during vehicle operation). The suspension assembly 92 includes a connecting member 96, a pair of suspension members or extension springs 100 and a suspension carriage 104. The connecting member 96 includes a pair of upturned flanges 108, four connecting flanges 112 and defines a suspension aperture 116 through each of the four connecting flanges 112. Each of the suspension apertures 116 are aligned with one of the apertures 56 of the cam plates 52 or one of the apertures 60 of the rear cam members 40 that is not used to connect the upper and lower frames 32, 44 to the front and rear cam members 36, 40. The connecting member 96 is pivotally connected to the front and rear cam members 36, 40 by inserting a fastener 120 through each set of aligned apertures. The connecting member 96 is pivotal relative to the front and rear cam members 36, 40 about the fasteners 120.

The springs 100 each include a hook 124 on each end thereof. The hooks 124 on one end of the springs 100 are hooked onto the upturned flanges 108 of the connecting member 96 and the hooks 124 on the other end of the springs 100 are hooked onto carriage flanges 128 of the suspension carriage 104. The springs 100 are connected between the connecting member 96 and the suspension carriage 104 in tension, thereby biasing the suspension carriage 104 toward the flanges 108.

The suspension system 24 further includes an adjusting mechanism or threaded rod 132 and a manually manipulatable handle 136 connected to and slidable along a first end of the rod 132. The rod 132 is rotatably connected to the upper frame 32 and has the first end extending out of a front of the suspension system 24 and has a second end rotatably connected to the upper frame 32 at a rear of the suspension system 24. The suspension carriage 104 is threadably connected to the rod 132 and is movable along the rod 132 in response to rotation of the threaded rod 132.

With reference to FIGS. 5–8, the handle 136 is connected to the end of the rod 132 extending out the front of the suspension system 24. The handle 136 defines a cavity 140 therethrough in which a surface or nut 144 of the threaded rod 132 is received. The nut 144 is connected to the rod 132 and is fixed for rotation with the rod 132. The cavity 140 and the nut 144 have complementary shapes to one another, such that rotation of the handle 136 facilitates rotation of the threaded rod 132 in a similar direction. In the illustrated embodiment, the cavity 140 is a hexagonal shaped cavity and the nut 144 is a complementary hexagonal shaped nut. Accordingly, edges of the hexagonal shaped nut 144 engage sides of the hexagonal shaped cavity 140 to facilitate rotation of the cavity 140 and the nut 144 in the same direction. It should be understood that the cavity 140 may be many shapes, such as, for example any polygonal shape, and the nut 144 can also be many shapes complementary to the shape of the cavity 140, such as, for example any polygonal shape, as long as rotation of the handle 136 facilitates rotation of the rod 132. It should also be understood that the shape of the nut 144 does not have to exactly mirror that of the cavity 140 for the nut 144 and cavity 140 to be considered to have "complementary shapes," as long as rotation of the handle 136 facilitates rotation of the rod 132.

The handle 136 is slidable along a portion of the rod 132 and the nut 144 is slidable within the cavity 140 of the handle 136. A boss 148 is positioned on one end of the cavity 140 to engage the nut 144 and limit movement of the handle 136 in a first direction out from the front of the suspension system 24 and a collar (not shown) is positioned around the rod 132 to engage the boss 148 and limit movement of the handle 136 in a second direction toward the front of suspension system 24. The handle 136 is slidable along the rod 132 between an extended position, in which the nut 144 engages the boss 148, and a retracted position, in which the boss 148 engages the collar.

Figure 8:
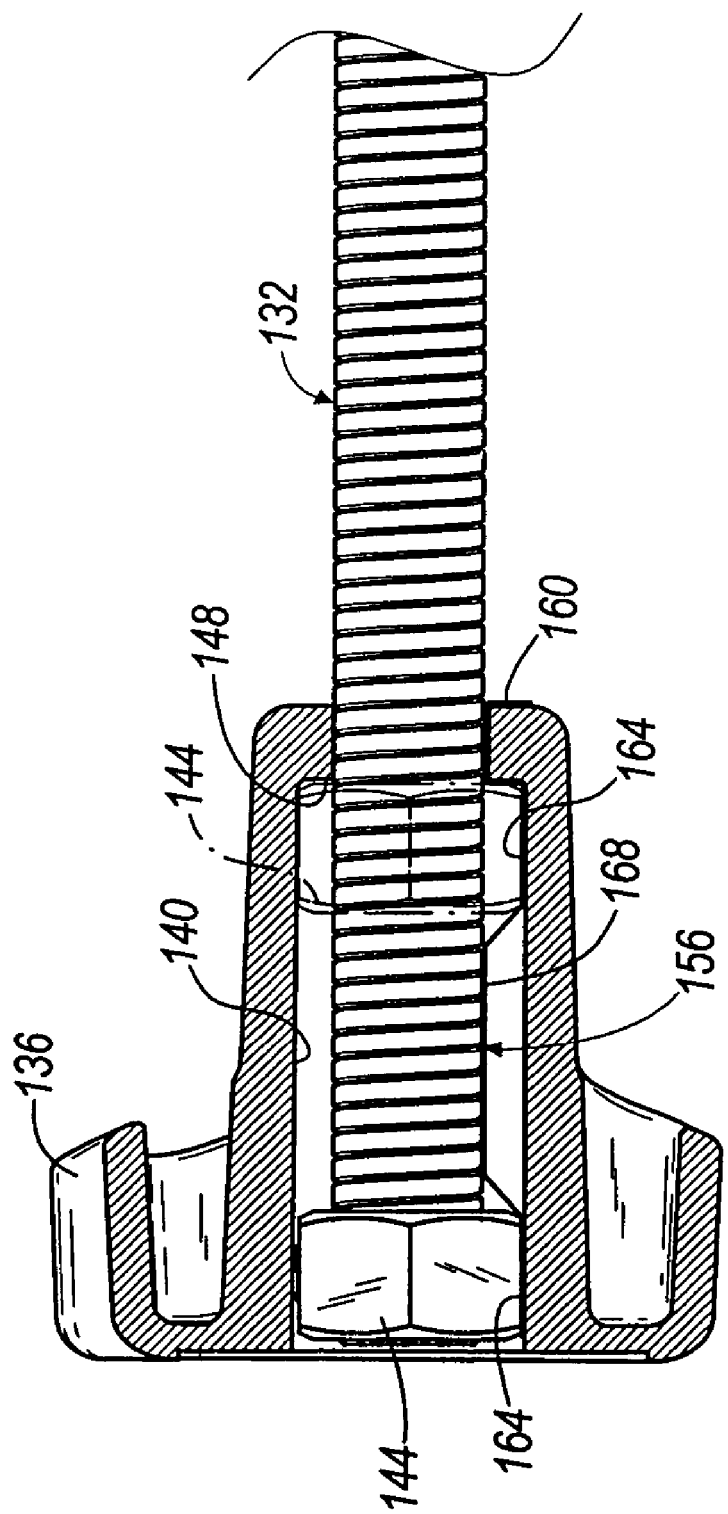
FIG. 8 is a cross-sectional view taken along line 8—8 in FIG. 7.

With particular reference to FIGS. 6–8, the handle 136 also includes an engaging member or leaf spring 156 positioned within the cavity 140 and engagable with the rod 132 to resiliently resist sliding of the handle 136 along the rod 132. The spring 156 includes an edge portion 160 engaging the boss 148 and partially wrapping therearound, a pair of non-resisting or flat portions 164 engaging a side of the cavity 140 and a resisting or raised portion 168 positioned between the flat portions 164 and spaced from the side of the cavity 140. The boss 148 has a spring recess 172 defined therein for receiving the edge portion 160 of the spring 156. The recess 172 is aligned with one of the hexagonal sides of the cavity 140 and assists in maintaining the spring 156 in proper alignment with the appropriate side of the cavity 140. The recess 172 may be defined in alignment with any of the sides of the cavity 140 and, accordingly, the spring 156 may be aligned with any of the sides of the cavity 140.

A pair of assembly apertures 176 are defined through the handle 136 and into the cavity 140. The assembly apertures 176 allow a tool to access the nut 144 when the nut 144 is appropriately aligned with the assembly apertures 176 in order to connect or disconnect the nut 144 from the rod 132. The handle may be disconnected from the rod 132 when the nut 144 is disconnected from the rod 132.

Now that the components of the suspension system 24 have been described, operation of the suspension system 24 will be described.

Figure 2:
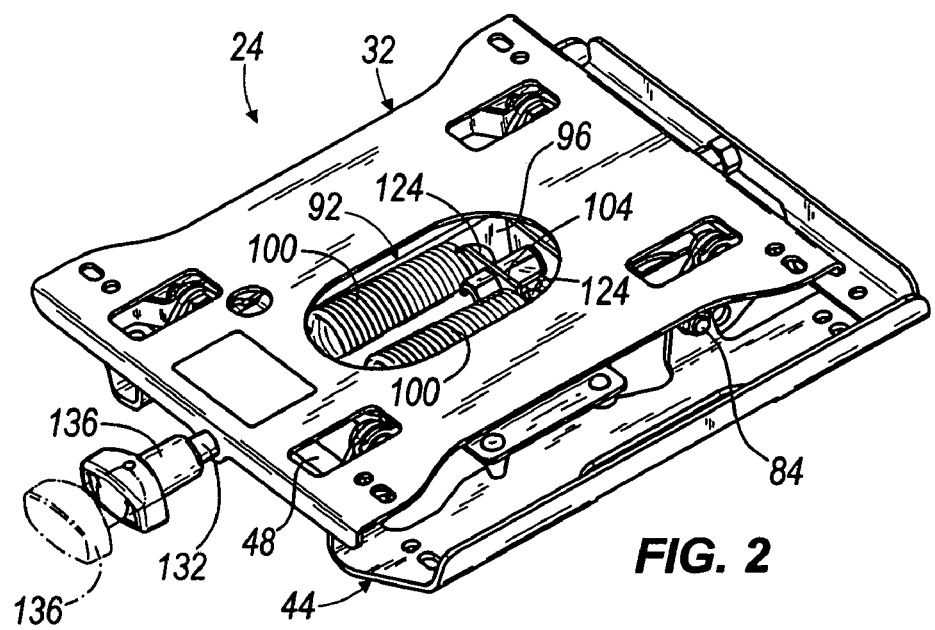
FIG. 2 is a top perspective view of the suspension system and the suspension adjusting handle shown in FIG. 1.

With reference to FIGS. 1–3, when an operator sits in the seat 20, the upper frame 32 is forced downward by the weight of the operator. Downward movement of the upper frame 32 causes the front and rear cam members 36, 40 to rotate in a clockwise direction (as viewed in FIG. 1), which moves the connecting member 96 and, particularly, the upturned flanges 108 away from the suspension carriage 104 to extend the springs 100. The suspension system 24 reaches a stable state when the weight of the operator is matched by the tension of the springs. 100 and the operator and seat 20 are suspended between the top (as shown in FIGS. 1–3) and bottom of the full range of motion of the suspension system 24. External forces may be applied to the suspension system 24 when the vehicle 28 is being operated. Such forces may be applied due to, for example, bumps in the terrain over which the vehicle 28 is traveling, braking or accelerating the vehicle 28, etc., and may deflect the springs 100 and cause the upper frame 32 to move down toward the lower frame 44. The springs 100 absorb such external forces and provide a more comfortable ride to the operator. The upper frame 32 returns to the top of the full range of motion when the operator dismounts the seat 20.

With reference to FIGS. 5–8, the stiffness of the suspension may be adjusted by an operator. More specifically, the operator may grasp and pull the handle 136 along the rod 132 from the retracted position (shown in solid in FIGS. 1–3 and 8), in which the handle 136 is substantially underneath the seat 20 and engages the collar, to the extended position (shown in phantom in FIGS. 1, 2 and 8), in which the nut 144 engages the boss 148 and the handle 136 clears the front of the seat 20 and is rotatable without interference from the seat 20. The engagement between the complementary shaped cavity 140 and nut 144 couples the rod 132 and the handle 136 for rotation together. Due to the threaded engagement between the rod 132 and the suspension carriage 104, rotation of the rod 132 causes the suspension carriage 104 to move along the rod 132 either toward or away from the upturned flanges 108 of the connecting member 96.

Once it is in the extended position, the handle 136 may be rotated clockwise and/or counterclockwise to extend and retract the springs 100 until the desired spring deflection and consequent spring "preload" is obtained. The further the springs 100 are deflected by the adjusting mechanism, the higher the preload and the stiffer the suspension. More specifically, movement of the suspension carriage 104 toward the upturned flanges 108 decreases the preload deflection of the springs 100 and softens the suspension, and movement of the suspension carriage 104 away from the upturned flanges 108 increases the preload deflection of the springs 100 and increases the stiffness of the suspension. After the stiffness of the suspension is set, the handle 136 may be pushed back along the rod 132 to the retracted position to inhibit snagging, bumping, etc. of the handle 136.

With reference to FIGS. 4 and 8, the engaging member 156 engages the rod 132 to resiliently resist sliding of the handle 136 along the rod 132 under the weight of the handle 136 when the seat 20 and suspension system 24 are positioned in a non-horizontal position (see FIG. 4). It should be noted that, for the seat illustrated in FIG. 4, only a portion of the weight of the handle 136 is directed along the length of the rod 132 because the threaded rod 132 is not vertical. The engaging member 156 only has to resist the portion of the weight of the handle 136 that would tend to cause the handle to slide along the threaded rod.

When the handle 136 is in the retracted position, the nut 144 is aligned with the leftmost (as viewed in FIG. 8) flat portion 164 and the raised portion resiliently engages threads of the rod 132. The leftmost edge (as viewed in FIG. 8) of the raised portion 168 also engages the nut 144 and resiliently resists sliding of the nut 144 past the leftmost edge of the raised portion 168 and from the retracted position under the weight of the handle 136. In order to move the handle 136 along the rod 132 in a direction out from the front of the suspension system 24, a sufficient external force, such as, for example an operator pulling the handle 136, must be applied to the handle 136 in a similar direction. Such external force will force the nut 144 against the leftmost edge of the raised portion and deflect the raised portion 168 toward the side of the cavity 140 to allow the nut 144 to pass by the raised portion 168. With continued external force in the same direction, the nut 144 will slide into alignment with the rightmost flat portion 164 (as viewed in FIG. 8) and abut the boss to position the handle 136 in the extended position (shown in phantom in FIG. 8). In the extended position, the nut 144 is trapped between the rightmost edge (as viewed in FIG. 8) of the flat portion 164 and the boss 148. Engagement between the rightmost edge of the flat portion 164 resiliently resists sliding of the nut 144 past the rightmost edge and out of the extended position under the weight of the handle 136. The handle 136 can be returned to the retracted position by supplying sufficient external force on the handle 136 in a direction toward the front of the suspension system 24 to deflect the raised portion 168 and move the nut 144 past the rightmost edge of the raised portion 168.

Although particular constructions of the present invention have been shown and described, other alternative constructions will be apparent to those skilled in the art and are within the intended scope of the present invention. Thus, the present invention is to be limited only by the claims.

We claim:

1. A suspension system for a seat on a vehicle, the suspension system comprising:
   a first frame member;
   a second frame member connectable to the seat and coupled to the first frame member, the second frame member being movable relative to the first frame member;
   a suspension member coupled to both the first frame member and the second frame member, the suspension member suspending the second frame member above the first frame member;
   an adjustment mechanism coupled to the suspension member and manually manipulatable by an operator to adjust the stiffness of the suspension;
   a handle to facilitate manual manipulation of the adjustment mechanism, the handle being movable along a portion of the adjustment mechanism between a first position and a second position; and
   an engaging member resiliently resisting movement of the handle between the first position and the second position;
   wherein the adjustment mechanism is a threaded rod; and
   wherein the engaging member engages threads of the threaded rod to resiliently resist movement of the handle between the first and second positions, such that, the handle does not move between the first and second positions unless sufficient external forces are exerted on the handle, the sufficient external forces being in excess of the weight of the handle.

2. The suspension system of claim 1, wherein the handle is rotatable to adjust the stiffness of the suspension and is slidable along the portion of the adjustment mechanism between the first and second positions.

3. The suspension system of claim 1, wherein the handle is rotatable to facilitate rotation of the adjustment mechanism to adjust the stiffness of the suspension, and wherein the handle defines a polygonal cavity therein, and wherein the adjustment mechanism includes a polygonal surface positioned in the polygonal cavity of the handle and shaped complementary to the polygonal cavity of the handle, such that, rotation of the handle causes rotation of the adjustment mechanism in a similar direction, and wherein the engaging member is positioned in the polygonal cavity of the handle and engages the adjustment mechanism to resiliently resist movement of the handle between the first and second positions, such that, the handle does not move between the first and second positions unless sufficient external forces are exerted on the handle, the sufficient external forces being in excess of the weight of the handle.

4. The suspension system of claim 3, wherein the engaging member includes a resisting portion, a first non-resisting portion positioned on a first end of the resisting portion and a second non-resisting portion positioned on a second end of the resisting portion, the resisting portion is operable to resiliently engage the polygonal surface of the adjusting mechanism and resist movement of the handle between the first and second positions, the handle is in the first position and resisted from moving from the first position when the polygonal surface of the adjusting mechanism is aligned with the first non-resisting portion and is in the second position and resisted from moving from the second position when the polygonal surface of the adjusting mechanism is aligned with the second non-resisting portion.

5. The suspension system of claim 1, wherein the handle is rotatable to facilitate rotation of the adjustment mechanism to adjust the stiffness of the suspension, and wherein the handle defines a hexagonal cavity therein, and wherein the adjustment mechanism includes a hexagonal surface positioned in the hexagonal cavity of the handle and shaped complementary to the hexagonal cavity of the handle, such that, rotation of the handle causes rotation of the adjustment mechanism in a similar direction, and wherein the engaging member is positioned in the hexagonal cavity of the handle and engages the hexagonal surface to resiliently resist movement of the handle between the first and second positions, such that, the handle does not move between the first and second positions unless sufficient external forces are exerted on the handle, the sufficient external forces being in excess of the weight of the handle.

6. The suspension system of claim 1, wherein the handle is rotatable to facilitate rotation of the adjustment mechanism to adjust the stiffness of the suspension, and wherein the handle defines a cavity therein, and wherein the adjustment mechanism includes a nut positioned in the cavity of the handle, the nut being shaped complementary to the shape of the cavity, such that, rotation of the handle causes rotation of the adjustment mechanism in a similar direction, and wherein the engaging member is positioned in the cavity of the handle and engages the nut to resiliently resist movement of the handle between the first and second positions, such that the handle does not move between the first and second positions unless sufficient external forces are exerted on the handle, the sufficient external forces being in excess of the weight of the handle.

7. A suspension system for a seat on a vehicle, the suspension system comprising:
a first frame member;
a second frame member connectable to the seat and coupled to the first frame member, the second frame member being movable relative to the first frame member;
a suspension member coupled to both the first frame member and the second frame member, the suspension member suspending the second frame member above the first frame member;
an adjustment mechanism coupled to the suspension member and manually manipulatable by an operator to adjust the stiffness of the suspension;
a handle to facilitate manual manipulation of the adjustment mechanism, the handle being movable along a portion of the adjustment mechanism between a first position and a second position; and
an engaging member resiliently resisting movement of the handle between the first position and the second position;
wherein the engaging member is a leaf spring.

8. A suspension system for a seat on a vehicle, the suspension system comprising:
a first frame member;
a second frame member connectable to the seat and coupled to the first frame member, the second frame member being movable relative to the first frame member;
a suspension member coupled to both the first frame member and the second frame member, the suspension member suspending the second frame member above the first frame member;
an adjustment mechanism coupled to the suspension member and manually manipulatable by an operator to adjust the stiffness of the suspension;
a handle to facilitate manual manipulation of the adjustment mechanism, the handle being movable along a portion of the adjustment mechanism between a first position and a second position; and
an engaging member resiliently resisting movement of the handle between the first position and the second position;
wherein the adjustment mechanism is a threaded rod, and wherein the engaging member is a leaf spring that resiliently engages threads of the threaded rod and deflects upon the application of external forces.

9. A suspension system for providing suspension to a seat on a vehicle, the suspension system comprising:
a first frame member;
a second frame member connectable to the seat and coupled to the first frame member, the second frame member being movable relative to the first frame member;
a suspension member coupled to both the first frame member and the second frame member, the suspension member suspending the second frame member relative to the first frame member and at least partially damping oscillatory movement of the second frame member relative to the first frame member;
a threaded rod threadably coupled to the suspension member and being rotatable to adjust the damping characteristics of the suspension member;
a handle coupled to the threaded rod to facilitate rotation of the threaded rod, the handle being slidable relative to the threaded rod; and an engaging member resiliently engaging the threaded rod and resiliently resisting sliding of the handle relative to the threaded rod;

wherein the handle defines a polygonal cavity therein, and wherein the threaded rod includes a polygonal surface positioned in the polygonal cavity of the handle and shaped complementary to the polygonal cavity of the handle, such that, rotation of the handle causes rotation of the threaded rod in a similar direction, and wherein the engaging member is positioned in the polygonal cavity of the handle and engages the threaded rod to resiliently resist sliding of the handle relative to the threaded rod, such that, the handle does not slide relative to the threaded rod unless sufficient external forces are exerted on the handle, the sufficient external forces being in excess of the weight of the handle; and wherein the engaging member includes a raised portion, a first flat portion positioned on a first end of the raised portion and a second flat portion positioned on a second end of the raised portion, the raised portion is operable to resiliently engage the polygonal surface of the threaded rod and resist sliding of the handle relative to the threaded rod, the raised portion deflects upon the application of external forces to allow the polygonal surface to slide relative to the threaded rod.

10. The suspension system of claim 9, wherein the engaging member is a leaf spring.

11. The suspension system of claim 9, wherein the engaging member engages threads of the threaded rod to resiliently resist sliding of the handle relative to the threaded rod, such that, the handle does not slide relative to the threaded rod unless sufficient external forces are exerted on the handle, the sufficient external forces being in excess of the weight of the handle.

12. The suspension system of claim 9, wherein the engaging member is a leaf spring that resiliently engages threads of the threaded rod and deflects upon, the application of external forces.

13. The suspension system of claim 9, wherein the polygonal cavity is a hexagonal cavity, and wherein the polygonal surface of the threaded rod is a hexagonal surface.

14. A suspension system for providing suspension to a seat on a vehicle, the seat being pivotal relative to the vehicle between a substantially horizontal position and a non-horizontal position, the suspension system comprising:

a first frame member;

a second frame member connectable to the seat and coupled to the first frame member, the second frame member being movable relative to the first frame member, the second frame member being pivotal with the seat between the substantially horizontal position and the non-horizontal position;

a suspension member coupled to both the first frame member and the second frame member, the suspension member suspending the second frame member relative to the first frame member and at least partially damping oscillatory movement of the second frame member relative to the first frame member;

a threaded rod threadably coupled to the suspension member and being rotatable to adjust the damping characteristics of the suspension member, the threaded rod being pivotal with the seat between the substantially horizontal position and the non-horizontal position;

a handle coupled to the threaded rod to facilitate rotation of the threaded rod, the handle being slidable along a portion of the threaded rod; and an engaging member resiliently engaging the threaded rod to resiliently resist sliding of the handle, under the weight of the handle, along the threaded rod when the threaded rod is in the non-horizontal position;

wherein the engaging member is a leaf spring.

15. The suspension system of claim 14, wherein the leaf spring resiliently engages threads of the threaded rod and deflects upon the application of external forces to allow the handle to slide relative to the threaded rod.

16. The suspension system of claim 14, wherein the engaging member deflects and allows the handle to slide relative to the threaded rod when external forces greater than the weight of the handle are applied to the handle, and wherein the engaging member resiliently engages the threaded rod to resist sliding of the handle relative to the threaded rod upon removal of the external forces from the handle.

* * * * *